US009466050B2

United States Patent
Yee et al.

(10) Patent No.: US 9,466,050 B2
(45) Date of Patent: Oct. 11, 2016

(54) SYSTEM AND METHOD FOR INTERACTIVE VISUAL REPRESENTATION OF ITEMS ALONG A TIMELINE

(75) Inventors: Roger Yee, Seattle, WA (US); Philip J. Burch, Seattle, WA (US)

(73) Assignee: EVDense Holding Company, Inc., Seattle, WA (US)

( * ) Notice: Subject to any disclaimer, the term of this patent is extended or adjusted under 35 U.S.C. 154(b) by 0 days.

(21) Appl. No.: 12/785,440

(22) Filed: May 22, 2010

(65) Prior Publication Data
US 2011/0214090 A1 Sep. 1, 2011

Related U.S. Application Data

(60) Provisional application No. 61/180,615, filed on May 22, 2009.

(51) Int. Cl.
*G06F 3/00* (2006.01)
*G06Q 10/10* (2012.01)
(52) U.S. Cl.
CPC ..................................... *G06Q 10/10* (2013.01)
(58) Field of Classification Search
None
See application file for complete search history.

(56) References Cited

U.S. PATENT DOCUMENTS

| | | | |
|---|---|---|---|
| 6,996,782 B2 | 2/2006 | Parker | |
| 7,146,574 B2 | 12/2006 | Goldthwaite | |
| 7,499,046 B1 | 3/2009 | Wright | |
| 7,703,044 B2* | 4/2010 | Graham | 715/838 |
| 7,788,592 B2* | 8/2010 | Williams et al. | 715/764 |
| 8,051,406 B2* | 11/2011 | Knight et al. | 717/117 |
| 2005/0012743 A1 | 1/2005 | Kapler | |
| 2005/0216838 A1* | 9/2005 | Graham | 715/713 |
| 2006/0116994 A1* | 6/2006 | Jonker et al. | 707/3 |
| 2006/0117067 A1 | 6/2006 | Wright | |
| 2006/0156246 A1* | 7/2006 | Williams et al. | 715/764 |
| 2007/0277148 A1 | 11/2007 | Venolia | |
| 2008/0235595 A1* | 9/2008 | Krantz et al. | 715/741 |

\* cited by examiner

*Primary Examiner* — Anil N Kumar
(74) *Attorney, Agent, or Firm* — Christensen O'Connor Johnson Kindness PLLC

(57) ABSTRACT

A system and method for data storage and data enhancement to facilitate the analysis of such data through a visual representation which depicts the data, its temporal aspects by aligning it along a timeline, and categorization of the data through tagging. The visual representation can be customized to analyze the data in various ways to identify potential patterns and share it with others.

12 Claims, 5 Drawing Sheets

SYSTEM AND METHOD FOR INTERACTIVE VISUAL REPRESENTATION OF ITEMS ALONG A TIMELINE

REFERENCE TO RELATED APPLICATIONS

This application claims an invention which was disclosed in Provisional Application No. 61/180,615, filed on May 22, 2009, entitled "Interactive Visual Display Provisional Patent". The benefit under 35 USC §119(e) of the United States provisional application is hereby claimed, and the aforementioned application is hereby incorporated herein by reference.

TECHNICAL FIELD OF THE INVENTION

The invention pertains to the field of information storage, enhancement, and analysis. More particularly, the invention pertains to a system and method for interactive visual representation, and the collection and enhancement of electronic files for analysis. A visualization tool is provided which allows for: entering and transferring a copy of an electronic file (uploading) into the system; enhancing data in the system; displaying the content of each file; and displaying an icon representation of each file along a timeline overlaid by tag labels. The tool provides for the visual arranging of tag labels, hiding of tags and content, and storing and recalling of such configuration settings.

BACKGROUND OF THE INVENTION

Traditionally, people, individuals or professionals have maintained diaries or maintained (paper) records to memorialize activities such as family events, business activities or transactions in general or around a particular issue. But as more records are digitally created and maintained, printing each action and maintaining printouts as paper files have become more challenging. As digital records can also be more easily manipulated with digital editing applications, printouts cannot be trusted anymore because such printouts may have been manipulated prior to printing. Digital records include, for example, email, chat or social media sessions, documents, spreadsheets or other files created by various software applications. Even records which traditionally have been analog are increasingly created digitally or can be converted to digital format: phone conversations are being transmitted using digital Internet protocols using Voice over Internet Protocol (VoIP); photos and videos are taken as digital pictures and motion files; music and voice mail are recorded as electronic files; video, chat, and audio streams can be stored as electronic files; and paper records can be scanned into digital images. Digital storage as an electronic file therefore provides a universal way to maintain records of any kind.

Archival of historic information may be useful in general to enable people to remember what they have been doing, and to enable people to share their experiences with others. In case of any type of dispute, records are often extremely important to resolve such dispute. Traditionally, paper records were sorted by date or organized into tabs or stacks of paper and enhanced with flags, sticky notes, highlighters, or notes on the margin or a separate piece of paper or separate documentation. Often none of this happened, and instead people just relied on the memory and knowledge of key individuals to understand the history of a particular transaction or relationship.

A need in the art therefore exists for a system and method that provides for storing any electronic file and for enhancing such files so that relevant files can be identified, displayed, analyzed, and shared.

DESCRIPTION OF RELATED ART

Online storage systems such as Flickr.com for pictures, Box.net for business documents or Youtube.com for video have made it easier to store and share digital data.

Sophisticated tools have been developed to gather references to digital information from multiple sources, and even to use automatic tools to understand some of the data and how one piece of information relates to another. Those tools may assist investigators by focusing on multi-dimensional representation of digital information through artificial intelligence analysis, but those tools require multiple annotation steps such as defining search terms, linking, and annotation on an item by item basis. Oculus Info Inc. has applied for several patents (U.S. Pat. No. 7,499,046, application Ser. Nos. 10/810,680, 11/289,381, 11/289,469, and 11/439,561) for such designs. However, the approach provided by these tools is too laborious for the maintenance of simple records for individuals or as part of people's usual business processes.

The legal profession also has developed sophisticated tools to gather digital evidence across an organization for analysis in a legal investigation. These tools are usually referred to as Electronic Data Discovery (EDD) tools. They allow for keyword searches, may provide automatic analysis of key concepts, may eliminate duplicate records, and may identify key individuals and how they interact (for example, through email). These tools might even show how many emails were sent over a time period (see Kodak U.S. Pat. No. 6,996,782). These tools are geared at after-the-fact analysis by professional investigators, but do not provide simple, ongoing, dynamic support for data enhancement and timeline visualization. These tools also focus on search and analysis of written information, but cannot handle unsearchable media files such as pictures, videos, and audio files.

In addition, general business tools (such as Microsoft Outlook) have used timeline displays to visualize historic information (see also Goldthwaite U.S. Pat. No. 7,146,574), but once there are more than a few dozen of items on the timeline, organizing and filtering of the relevant information becomes a challenge. When applied to written information, these general business tools can use textual analysis and search, but these tools also cannot handle unsearchable media files such as pictures, videos, and audio files.

SUMMARY OF THE INVENTION

The preferred embodiment of the present invention addresses the above-described problems of keeping track of digital information and analyzing such records by providing a computer system and method—a visualization tool—which provides data storage, enhancement, analysis, and sharing. The preferred embodiment will also be referred to as the digital diary system. Typically the data is collected and enhanced shortly after events happen or at least within a few days. But the data can also be collected and enhanced months or even years later. Preferably the system is implemented within a secure Internet Data Center (IDC) and accessible anywhere over the Internet from any personal computer (PC) or Internet-connected mobile device. To ensure data privacy and confidentiality, a new user of the system must create a separate account. If a user needs to access the data later, the user needs to log-in.

According to the preferred embodiment of the present invention, the system keeps track of data items, typically an electronic file and its associated meta data (i.e., any additional data which enhances the electronic file). Electronic files and therefore data items can be of various types: notes, word processing documents or emails (e.g., TXT, DOC, RTF, HTML, MSG files), digital paper images such as portable document format (PDF files), digital pictures (e.g., JPEG, BMP, PNG files), audio recordings such as voice mails (e.g., WAV, WMA or MP3 files), video files (e.g., MPEG4, Motion JPEG, WMV files), or any other type of electronic files. Paper documents and pictures can be photographed or scanned by a document scanner or copy machine and also uploaded. As digital cameras become more common and more mobile devices, such as smart phones and media players, include cameras, digital pictures can easily be taken to capture the surrounding circumstances of any activity (e.g., a meeting at a certain place or the signing of a document), and then uploaded.

According to the preferred embodiment of the present invention, these files need to be available on an Internet connected computer from where they can be uploaded into the digital diary system. The preferred embodiment also includes the ability to create electronic files such as text notes, audio recordings, or pictures directly and upload them into the digital diary system for storage. The digital diary system then records the date and time of the upload as the storage date and ensures that the uploaded electronic files cannot be later modified.

In an alternative embodiment of the present invention, a mobile device (e.g., Apple iPhone) with an Internet connection and with appropriate device-specific software implementation of the digital diary visual interface (or any subset of it) is used. Once such software is installed, such system can be used to create electronic files, log into the account, and upload created or existing electronic files. The software may also include the ability to upload device-specific data such as call logs (which may include: a phone number; type: incoming/outgoing/missed; date; and time) or Global Positioning System (GPS) information as an electronic file.

The technical advantages of the present invention are that: any type of data can be recorded; the digital diary system ensures only authorized users can access the data; the date and time when the data was uploaded is accurately recorded; and each uploaded electronic file cannot be manipulated after the upload. If the digital diary system is operated by a party independent from the events which are recorded, then in case of a dispute, the operating party can vouch for the integrity of the data. In contrast, traditional paper records cannot accommodate certain data (e.g., media files such as pictures, videos, and audio files), can be manipulated or altered, can be lost or destroyed, or can get into the possession of unintended persons. Even modern digital storage solutions, such as personal hard disks or traditional web-based email (e.g., Hotmail, Gmail or Yahoo) or storage systems (e.g., Box.net), allow for editing and deletion of files and may not adequately protect the privacy of the data.

According to the preferred embodiment of the present invention, once electronic files are uploaded to the digital diary system, the digital diary system allows the user through the data enhancement interface to enter and edit meta data of the uploaded electronic files. The user can add comments to any file. For example, a user may want to explain the circumstances of a particular picture, including who is shown in such a picture. The digital diary system automatically records the date and time each file was uploaded and will also attempt to extract the file creation date and Global Positioning System (GPS) information. The user also can enter the date and time of the event to which the file refers.

To organize the data into categories, the data enhancement interface also allows the user to associate each data item with any number of keywords called tags. Each such tag can represent an information category. To provide further grouping, the digital diary also provides special tags called folders. Each file can be associated with one or more folders. The digital diary system also provides statistics to the user on how much data enhancement has been done to encourage further data enhancement efforts, thereby improving later analysis.

Further technical advantages are realized by the digital diary system providing a timeline interface which allows the user to visually analyze the uploaded and enhanced data on a timeline and may allow identifying patterns. The timeline interface shows a full timeline representation on the top and a partial timeline representation on the bottom. Both timelines show data items as an icon and file name arranged by their event, creation, or storage date with earlier items to the left and later items to the right and earlier time of day towards the top and later times towards the bottom. If a long time has passed between the earliest and latest item and with a lot of items, the full timeline is very crowded. Therefore a partial timeline is shown on the bottom. The user can scroll through the partial timeline, zoom into a shorter time frame or zoom out to see a longer time frame. The time frame shown by the partial timeline is highlighted on the full timeline above. The user can click on any date on the full timeline to change the focus of the partial time line to the indicated date. The user can also click on any item to view its meta data, including a preview of its content, and download the file to review the content.

Overlaid onto the partial timeline are labels for each tag. The user can drag the tag label with a pointing device, such as a computer mouse, touchpad, or finger on a touch sensitive screen, to position the label to the user's liking within the area occupied by the partial timeline and its background. Each tag label has lines connecting the tag label to any item with which it is associated.

Once the user has set a certain timeline interface configuration by setting options such as filters, time frame and zoom level, tag label colors and placement, the user can name and save this configuration as a workspace so it can be recalled later.

Once such subset of items and tags is selected, the digital diary system's sharing interface can be used to print or download the items. An account owner can also choose to share the owner's data with an associate over the Internet.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

The present invention, referred to as the digital diary system, allows an individual to store, enhance, analyze, and share data. The focus of the invention is the interactive visual representation of such data as it allows the user to visually analyze the uploaded and enhanced data on a timeline, and may allow the user to identify patterns, such as trends or behaviors.

Figure 1A:
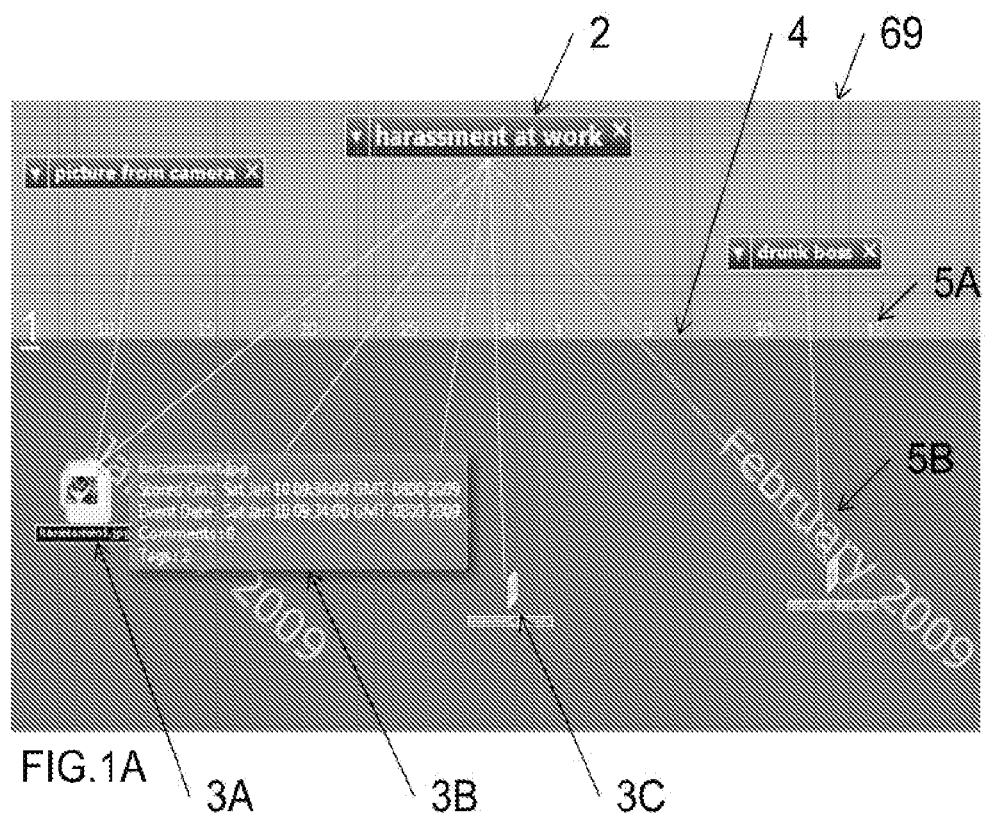
FIG. 1A illustrates representative screen shots of the timeline interface of the preferred embodiment with a partial timeline on the bottom with items and tag labels and their connections.

Referring to FIG. 1A, there is a display area 1 (provided by the timeline interface 33) which displays data items such as 3A and 3C within a certain time frame along a partial timeline 4 over a background 69. The partial timeline 4 is labeled with the month 5B and date 5A. Each data item is represented by an icon showing either a thumbnail preview, such as a picture 3A or a yellow pad 3C icon, or an icon specific to the file type in angled view and the file name of the item. If there are multiple items in close proximity (i.e., almost the same date/time), they are shown as stacked icons. If a user hovers a pointing device over a data item 3A, the icon pops up and turns into full view and a popup window 3B shows further data item details such as the file name (e.g., "harassment.jpg"), store and event date, and the number of comments and tags. Double-clicking on a data item shows further details, a preview of the content of the electronic file represented by the data item, and e.g. the ability to download the electronic file so its content can be displayed by an appropriate application.

Overlaid onto the partial timeline 4 are labels 2 for each tag (such as "harassment at work", "picture from camera", "drunk boss"). The user can drag the tag label 2 with a pointing device to position the label 2 to the user's liking within the area occupied by the partial timeline 4 and its background 69. Each tag label has lines connecting the tag label 2 to any item 3 with which it is associated. The more items with which the tag is associated, the bigger (i.e., larger font size) the tag label 2 appears in comparison to less used tags. If the user double-clicks with a pointing device on the tag label 2, a list of all data items pops up which are associated with this tag so that the user can further inspect the details of the files.

The user can also drag the partial timeline 4 to the right or left to show earlier or later data items 3. The placement of the tag labels 2 does not change, but the lines connecting them with the data items are redrawn to reflect the new locations of the data items. As more data items show up, new lines are added and as data items drop off the visible time frame, lines are removed.

The user can drop an item 3 onto a tag label 2 to associate that item with that tag.

Figure 1B:
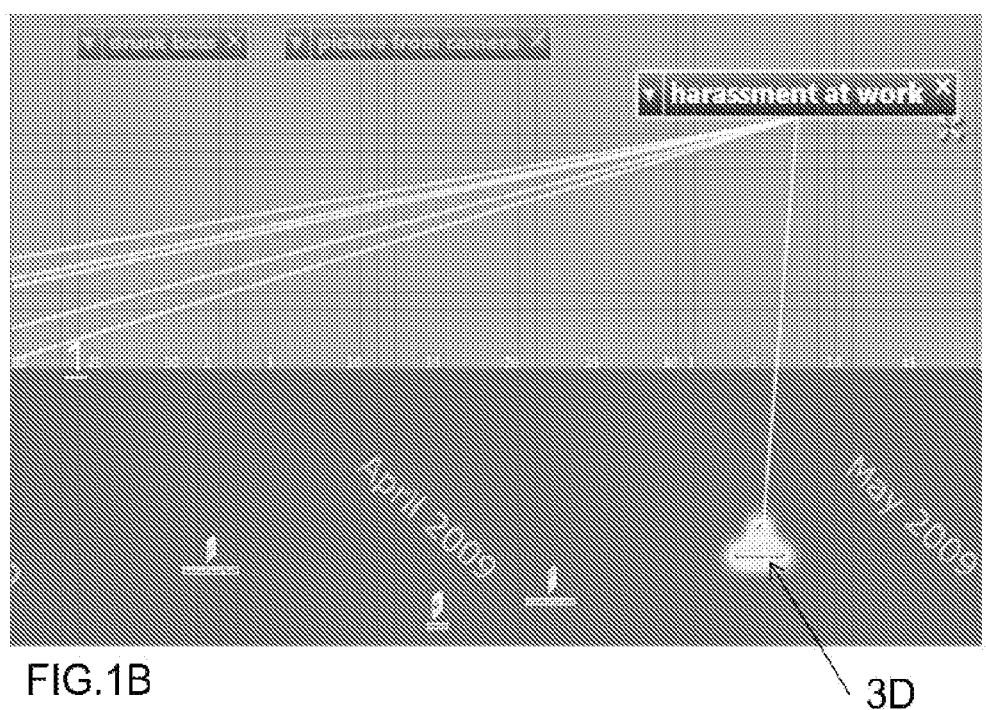
FIG. 1B illustrates representative screen shots of the timeline interface of FIG. 1A with one tag label highlighted.

Referring to FIG. 1B, if a user hovers over a tag label 2 with a pointing device, all data items 3D and lines associated with that tag are highlighted in the tag label color and lines are added in the direction of any additional associated off-screen data item (in this case four earlier items).

Figures 1C, 2:
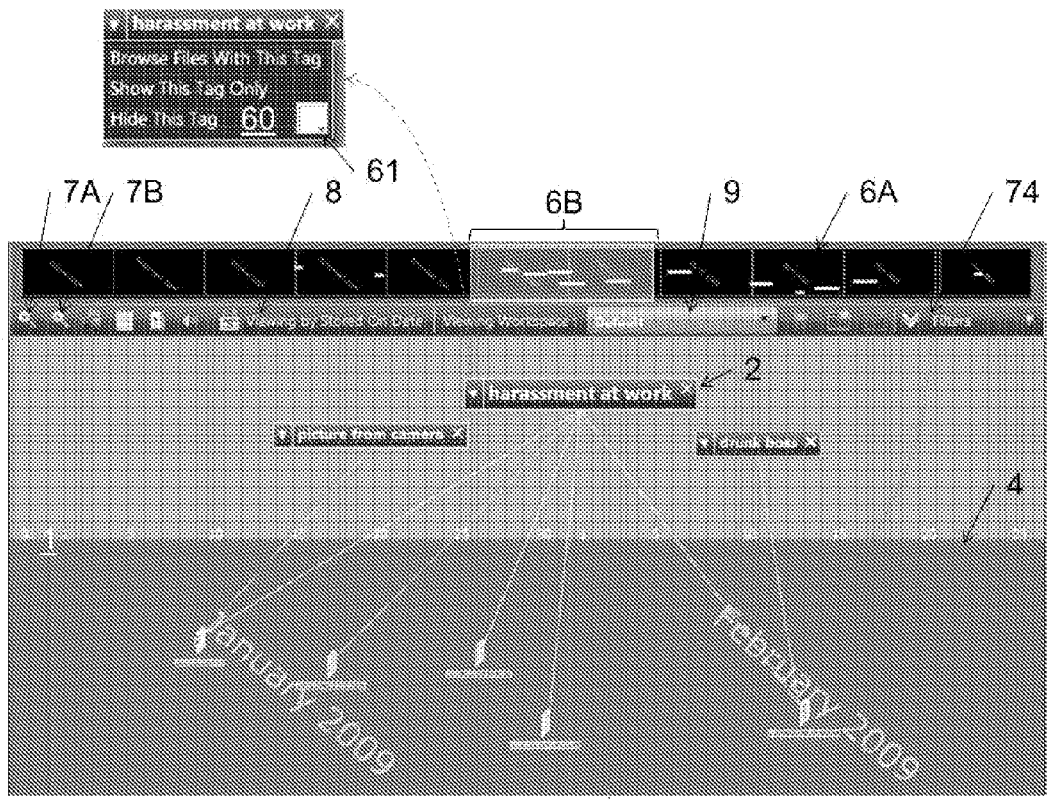
FIG. 1C illustrates representative screen shots of the timeline interface of FIG. 1B with an additional full timeline above.
FIG. 2 illustrates representative screen shots of the filter popup dialog of the time line interface of the preferred embodiment.

Referring to FIG. 1C, if the user clicks on the down arrow to the left of the tag label 2, a tag drop down menu 60 appears and allows the user (1) to see the same data item popup as displayed when double-clicking on the tag label (see above), (2) to hide any other tag labels other than the selected one, (3) hide this tag, or (4) click on the color selection button 61 to rotate through a number of predefined colors to change the color of the tag label 2 to color-code the tag display.

FIG. 1C also shows at the top of the display area 1 an additional full timeline 6A which is a small scale representation of the timeline showing all stored data items with the earliest item on the left and the latest item on the right whereas the portion 6B representing the time frame shown by the partial timeline 4 is highlighted. The user can click anywhere on the full timeline 6A to change the time frame of the partial timeline 4 or drag the highlighted portion 6B to the left or right to move the displayed time frame to a later or earlier time.

Under the full timeline 6A additional buttons are shown to manipulate the current timeline interface. The Zoom-In button 7A reduces the time frame represented by the partial timeline 4 whereas the Zoom-Out button 7B increases the time frame. With the button 8 the user can switch the order in which the data items are arranged on the timeline, which can be either the storage date or event date of the items. If the items are ordered by event date, the user can drag an item with a pointing device along the timeline to change the event date, but not any later than the storage date.

Clicking on the Filters button 74 brings up the filter popup window 70 shown in FIG. 2 which allows the user to filter the data items shown on the timeline to a subset of folders 71, tags 72, and file types 73 by checking the appropriate checkboxes. As the user selects a set of folders from the list 71, the tag list 72 and file type list 73 is reduced to the tags and types included in the selected folders and again can be further reduced by the user by selecting the applicable tags and types. Alternatively tag labels can be hidden by direct manipulation of the tag label 2 as described above.

These many customization and filter settings allow the user to focus attention on certain information categories. Such information filtering can help the user to identify patterns of fraud or abuse for example.

Once the user has set a certain timeline interface configuration by setting options such as filters, time frame and zoom level, tag label colors and placement, the user can name and save this configuration as a workspace so it can be recalled later. Referring again to FIG. 1C, the Viewing Workspace button area 9 provides (from left to right) a way to load a named workspace by selecting such workspace from a drop down list, to save a workspace, to create a new workspace, and to delete an existing workspace.

Once such subset of items and tag labels is selected, the digital diary system's sharing interface 34 can be used to print the items either in summary (with information such as file name, tags, date/time) or even including the content of the file or including a visual representation of the timeline similar to the one provided by the timeline interface 33. The items and tags can also be downloaded to a local hard disk, memory stick, or stored onto a compact disc. Optionally the downloaded files may include an application which provides standalone (i.e., without Internet) connection to the digital diary system, viewing of the same timeline interface as provided by the digital diary system, but without any editing capability.

To ensure data privacy and confidentiality, each new user of the digital diary system must create a separate account. The process of creating a separate account (1) entitles each new user to become the owner of that account and of its data, and (2) requires each new user to establish account credentials, such as user identification (userid) and password. The account owner gains access to the account, and the private and confidential data stored therein, by entering in the account user's unique credentials. Through the digital diary system's sharing interface 34 the account owner can also choose to share the owner's data with an associate over the Internet by entering the associate's email address and specifying a password. The account owner also can specify the type of access is granted to an associate, such as whether the associate can upload files, make comments, or just view the timeline and its items. The associate will then receive an email invitation with a link to the login page of the digital diary system. Once the associate enters the password the associate received through other means such as a phone call, the associate sees a similar timeline interface 33 as the account owner. Certain options may not be available to the associate based on what access was granted to the associate by the account owner. If the associate makes any comments or adds any tags, those are preceded by the associate's name so that the owner is alerted to the associate's contributions. For any activity by any associate, the owner also receives a daily email summary with a list of such activities.

Once a new account is created, electronic files need to be uploaded into the digital diary system through the item upload interface 31. The preferred embodiment brings up a dialog to browse any files accessible on the user's computer so that the user can select which ones to upload. It also allows the user to create a note by entering a name and the note content on a yellow pad background and upload such electronic note file as a hyper text markup language (HTML) file to the digital diary system. Alternative embodiments may also provide methods for taking pictures or recording voice or video files and uploading them. Optionally such embodiments may prompt to enter a name, comment, or a series of tags to be associated with the data item. In any case the digital diary system automatically records the date and time each file was uploaded as the item's storage date and the system also attempts to extract the file creation date and GPS (Global Positioning System) location information.

Figure 3:
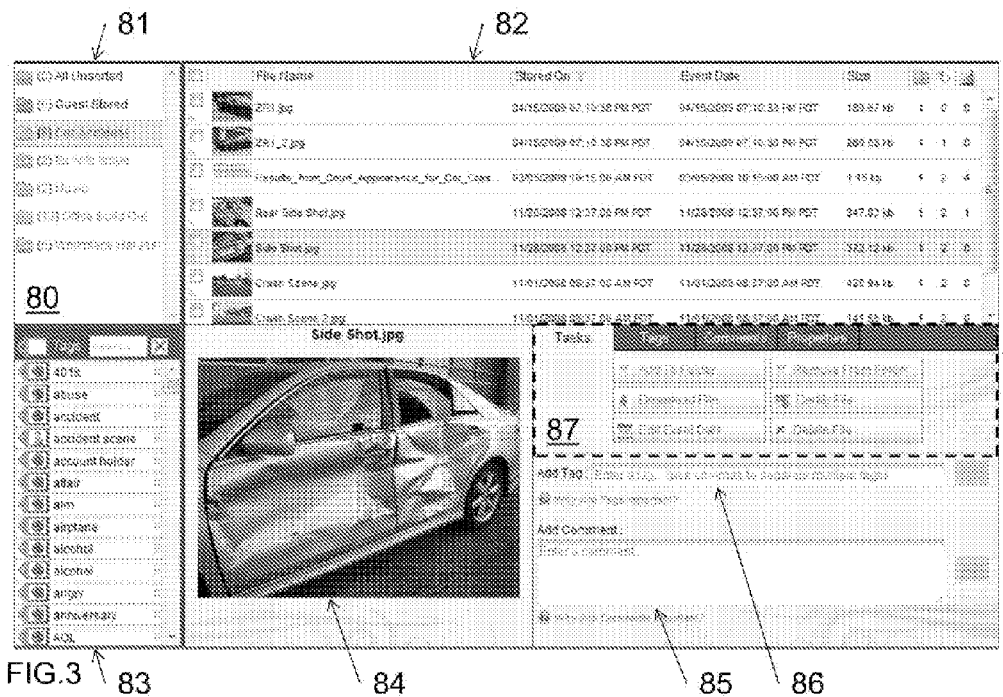
FIG. 3 illustrates representative screen shots of the data enhancement interface of the preferred embodiment.

In FIG. 3, the picture shows a representative of the data enhancement interface 80. A folder of data items can be selected from the folder list 81 (e.g. "Car Accident"), then to the right a data item list 82 is shown with a file type icon or a thumbnail preview of the content (a bigger version is shown in the preview area 84 below), such as a picture or yellow pad note, with the file name, stored and event date, size, and number of folder the item is contained in as well as the number of tags and comments. The checkbox on the left of each item allows a user to select multiple items for display and edit. A tag list 83 is shown on the bottom left. A user can drag with a pointing device a tag from that list and drop it onto the Add Tag field 86 for tagging data items selected from the item list 82. Under the Tag field a Comment field 85 allows to add comments to the selected data items. The buttons in action area 87 allows a user to add the items to another folder or remove them from folders, download the associated files, edit the event date, digitally certify the files, or delete items. Tabs in the action area 87 also allow for displaying and editing all tags associated with the selected items, display, add, or delete comments, and display additional properties such as stored date and edit the event date statistics on how much data enhancement has been done. If the system identifies a low level of data enhancement (below a standard of usage set by a larger population of like users), it encourages further enhancement efforts to support meaningful analysis later.

Figure 5:
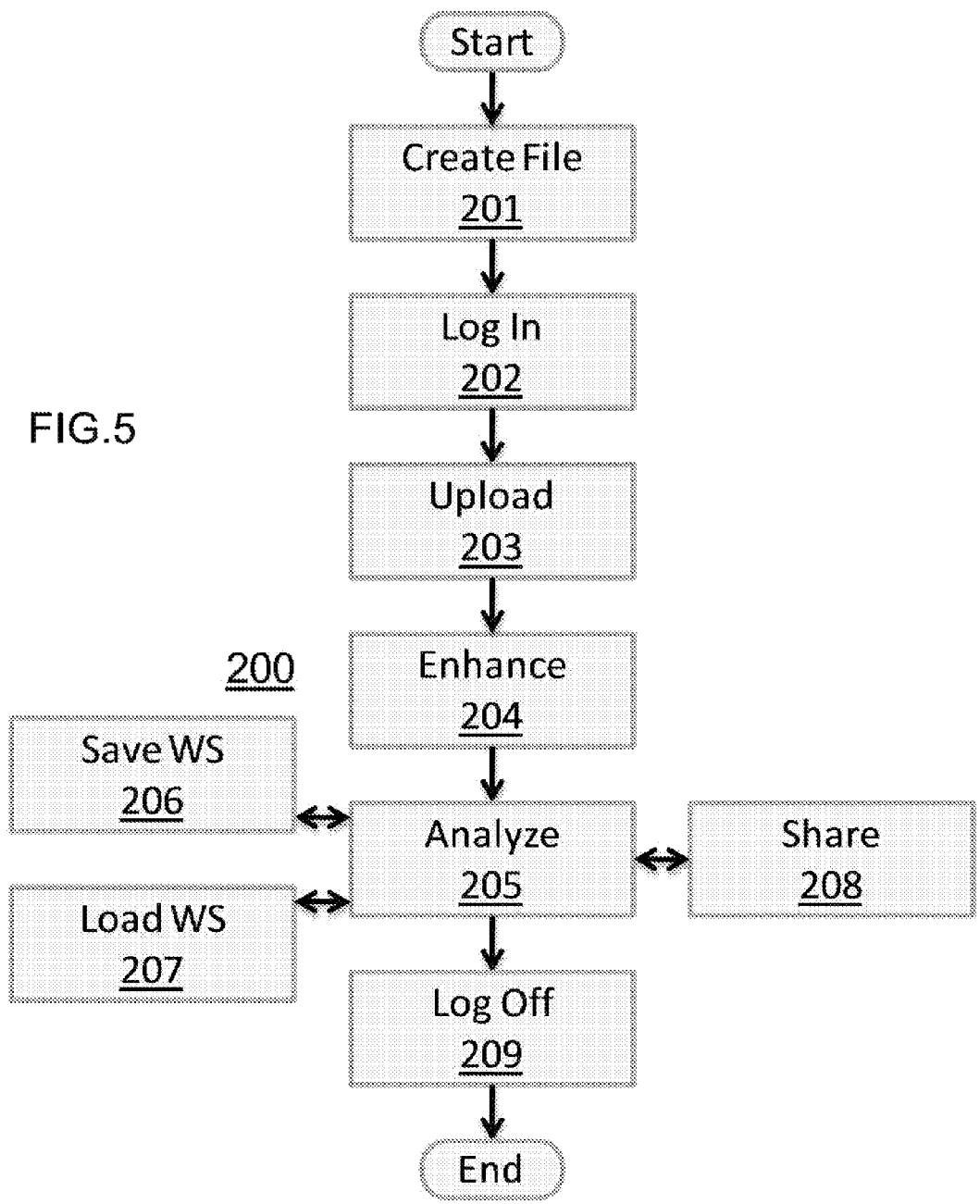
FIG. 5 illustrates a flow diagram of the marshalling and visualization process of the present invention.

In FIG. 5, a flow diagram 200 of the preferred embodiment of the digital diary system is depicted. In the first step 201, an electronic file is created for example by a digital camera or by the user entering a note. In order to access the digital diary's account, the user then needs to log in (step 202) by entering a valid userid and password. Only after proper authentication, at step 203 the user can upload the file and enhance the data (step 204) by for example associating tags, and entering dates and comments. Both step 203 and 204 can be repeated in any order. Once data has been uploaded and enhanced, the user can analyze the data visually in step 205. The user may configure the visual display by filtering and arranging various aspects of the display and save such configuration as a workspace (step 206) so that it can be recalled at a later point in time (step 207). At step 208 the user may also share the configured and selected item by printing them, downloading them, or sharing them with other users over the Internet. Once the user is done, the user may log off (step 209).

This concludes the description of the visual interface 30 and its four components.

Figure 4:
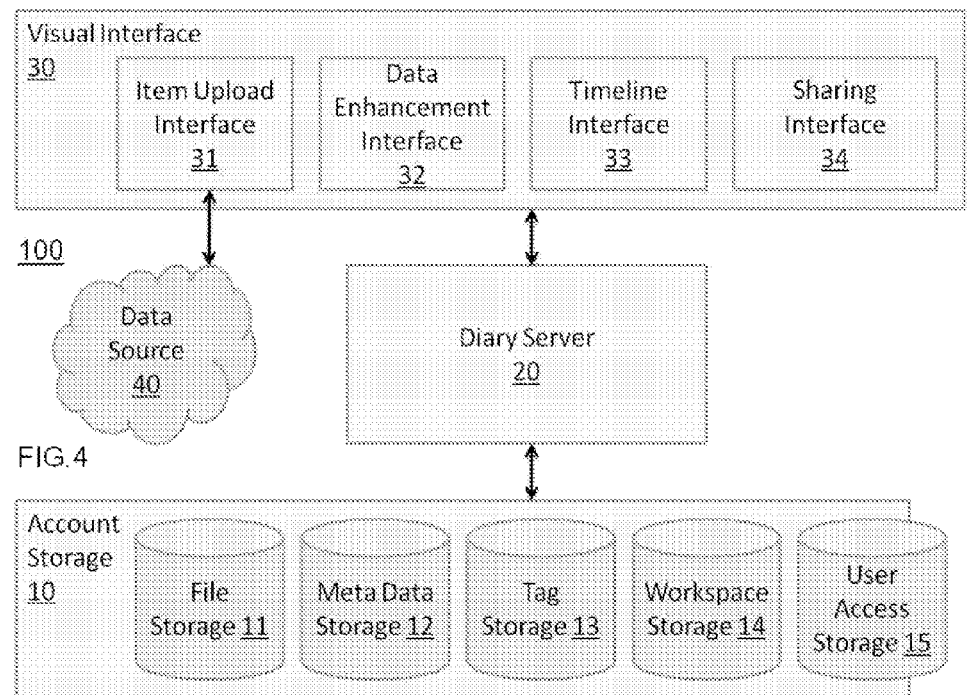
FIG. 4 is a block diagram of a data processing system for a visualization tool in accordance with an embodiment.

In FIG. 4, the block diagram 100 describes the major components of the digital diary data processing system. The system is structured as an industry-standard three tier architecture: presentation layer is provided by the visual interface 30, the business rules layer is provided by the diary server 20, and the storage layer is provided by the account storage component 10.

To ensure data privacy and confidentiality, a new user of the system must create a separate account. Any subsequent uploaded or created data is stored within that account. Each user of the digital diary system needs to create a userid and password (independent of accounts). Once a user is authenticated by providing the proper userid and password, the user gains access to the accounts whose account owners have granted the user some type of access to the owner's account. The userid and password and what account access is granted to each user is stored in the user access storage 15. Once authenticated to access an account, the user can upload files which are stored in the file storage 11. Each account maintains a list of tags which is stored in the tag storage 13. A user can enhance the data, for example by adding comments and associating files with tags, and thereby creating meta data which is stored in the meta data storage 12. Once the user starts analyzing the data, the user may also want to save a certain configuration of filters, tag labels, zoom levels etc. as a named workspace which is stored in the workspace storage 14.

The diary server 20 provides a set of web services which take the input from the visual interface 30, enforces any business rules, for example files can only be linked to existing tags and by authorized users, and stores the data in the account storage 10 or responds to requests from the visual interface 30 by retrieving the data from the account storage 10, and returns them to visual interface component 30 for presentation.

The visual interface component 30 provides the user interface and its four components are described in detail above. The item upload interface 31 allows a user to upload digital data from various data sources 40 as electronic files to the digital diary system. Data sources may include the local hard disk, other systems which are connected to the user's PC, or portable media such as a USB drive or a memory card. The data enhancement interface 32 allows the user to enter meta data such as comments and associations of files with tags. The timeline interface 33 allows for display and analysis of all stored data items and they can be printed, downloaded, or shared over the Internet through the sharing interface 34.

Figure 6:
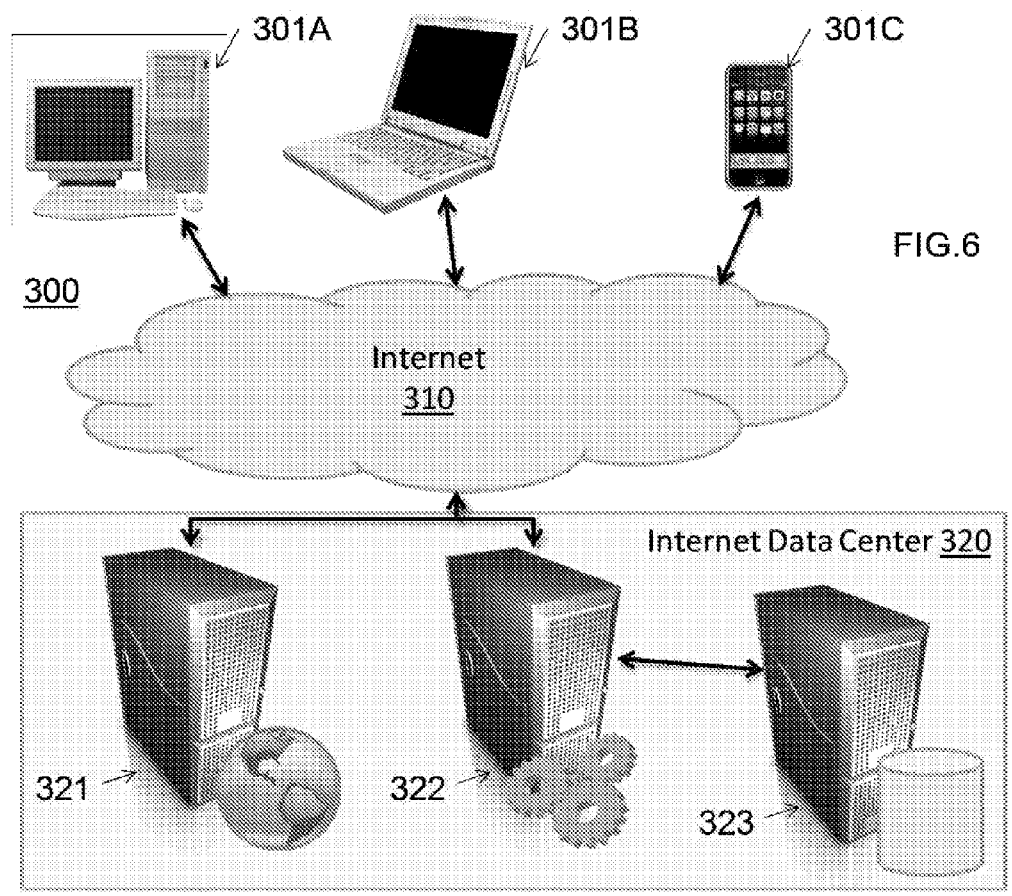
FIG. 6 illustrates a block diagram of a hardware implementation of a digital diary data processing system in accordance with an embodiment.

FIG. 6 illustrates one hardware implementation of the digital diary data processing system, and different implementation approaches are possible. The preferred implementation utilizes web client computers 301 to implement the visual interface 30. The client computer is typically a laptop 301B or desktop 301A running a web browser such as Internet Explorer, Firefox, or Safari on an operating system such as Microsoft Windows, Apple Mac OS X, or Linux which connects to the digital diary Internet data center 320 over the Internet 310. Alternatively the client computer could be a smart phone 301C, TV, game console or any other computer with a web browser. The preferred implementation of the various visual interfaces uses a combination of HTML pages with JavaScript or Adobe Flash components which both access the web service interfaces of the application server 322 which implements the diary server 20. Once the user connects to the web portal provided by the web server 321, the HTML pages and Flash components are loaded from the web server 321 onto the client computing device 301. Then the code embedded in the HTML pages and Flash components access the application server's web service interfaces and the diary server's software accesses the account storage component 10 running on the database server 323 to retrieve any necessary data.

Alternative implementations of the client may implement certain aspects or all of the visual interface 30 as a software component which is separately installed on the client computer and connects directly to the web services interfaces of the application server 322. An alternative embodiment is an application for the Apple iPhone which is downloaded and installed from the Apple iTunes Application Store to the phone 301C. The iPhone application implements the item upload 31 and certain aspects of the data enhancement interface 32. Another alternative embodiment is an eUploader application implemented using Adobe Air technology so that it can be installed on various types of client computers 301 independent of their operating system. The eUploader's user interface implements the item upload interface component 31 by providing a drop area on the desktop. A user can utilize a pointing device to drag a file from various file places on the client computer and drop it onto the user interface of the eUploader application causing that file to be uploaded to the digital diary system by the eUploader application calling on the web services interfaces of the application server 322.

Alternative implementations of the server components may implement the web, application, and database servers through multiple server each to increase scalability and fault tolerance. If a corporation is concerned about privacy, they may deploy a small system behind their firewall and use a single server instead of separate web, application, and database servers which simplifies the installation but may allow for a smaller number of concurrent users.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented method for providing a visual timeline display of digital data items comprising:
    (a) in response to receiving a plurality of digital data items, storing each of the digital data items, each of the received digital data items including digital data and metadata, the digital data including data representing one or more of notes, word processing documents, e-mail, digital paper images, digital pictures, audio recordings, video files, and electronic files, the metadata including time data;
    (b) in response to user input, enhancing the metadata included in the received and stored digital data items by adding one or more tags to the stored metadata, the tags including information category tags that identify the subject matter of the received and stored digital data items and folder tags that associate the information category tags; and
    (c) creating an interactive visual timeline display of selected ones of the stored digital data items and related information category tags by applying a filter to the interactive visual timeline display,
    wherein user selection of a folder tag in the filter results in automatic selection of one or more information category tags associated with the selected folder tag for display in the interactive visual timeline display while also permitting user selection of additional tags or file types in the filter, wherein time metadata included in the displayed digital data items controls the location of the displayed digital data items along one axis of the timeline display, wherein each displayed digital data item is identified by an interactive icon that, when selected by a user, causes information included in the digital data item to be displayed, wherein the interactive visual timeline display includes a display of each of the information category tags associated with the folder tag selected by the user and connections associating the displayed interactive icons to the displayed information category tags, and wherein the interactive visual timeline display includes a user interface that allows a user to configure the interactive visual timeline display by setting one or more options selected from the group consisting of filter, time frame and zoom level, tag label color, and placement options.

2. The computer-implemented method of providing a visual timeline display of digital data items as claimed in claim 1, wherein, in response to user input, the time frame of the timeline display is changeable by either increasing the time frame or decreasing the time frame.

3. The computer-implemented method of providing a visual timeline display of digital data items as claimed in claim 2, wherein, in response to user input, an order in which the digital data items are arranged is changeable.

4. The computer-implemented method of providing a visual timeline display of digital data items as claimed in claim 3, wherein the changeable order in which digital data items can be arranged selectively includes arranging the items (i) based on the date the event represented by the digital data item occurred; and (ii) based on the date the event represented by the digital data item was stored.

5. The computer-implemented method of providing a visual timeline display of digital data items as claimed in claim 4, wherein, if the digital data items are arranged based on the date the event represented by the digital data item occurred, in response to user input, changing the location of the digital data item along the interactive visual timeline display up to, but not later than, the date that the event was stored, thereby changing the date of the event.

6. The computer-implemented method of providing a visual timeline display of digital data items as claimed in claim 1, wherein, in response to user input, an order in which the digital data items are arranged is changeable.

7. The computer-implemented method of providing a visual timeline display of digital data items as claimed in claim 6, wherein the changeable order in which digital data items can be arranged selectively includes arranging the items (i) based on the date the event represented by the digital data item occurred; and (ii) based on the date the event represented by the digital data item was stored.

8. The computer-implemented method of providing a visual timeline display of digital data items as claimed in claim 7, wherein, if the digital data items are arranged based on the date the event represented by the digital data item occurred, in response to user input, changing the location of the digital data item along the interactive visual timeline display up to, but not later than, the date that the event was stored, thereby changing the date of the event.

9. The computer-implemented method of providing a visual timeline display of digital data items as claimed in claim 1, wherein after a user configures an interactive visual timeline by setting one or more options, in accordance with user input, the configuration is stored in memory for later recall.

10. The computer-implemented method of providing a visual timeline display of digital data items as claimed in claim 1, wherein at least one of the displayed information category tags include an interactive user interface element configured to allow a user that interacts with the user interface element to select one or more options for interacting with the at least one information category tag or other information category tags in the visual timeline display.

11. The computer-implemented method of providing a visual timeline display of digital data items as claimed in claim 10, wherein the one or more options for interacting with the at least one information category tag or other information category tags in the visual timeline display include at least one of the following: browse files with the at least one information category tag, hide the at least one information category tag, or hide other information category tags.

12. The computer-implemented method of providing a visual timeline display of digital data items as claimed in claim 10, wherein the interactive user interface element comprises a drop-down menu.

* * * * *